(12) United States Patent
Gao et al.

(10) Patent No.: US 9,209,741 B2
(45) Date of Patent: Dec. 8, 2015

(54) METHOD AND SYSTEM FOR CONTROLLING SYNCHRONOUS MACHINE AS GENERATOR/STARTER (71) Applicant: The Boeing Company, Chicago, IL (US)

(72) Inventors: Lijun Gao, Renton, WA (US); Shengyi Liu, Sammamish, WA (US); Matthew J. Krolak, Renton, WA (US); Eugene V. Solodovnik, Lake Stevens, WA (US); Kamiar J. Karimi, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/187,851

(22) Filed: Feb. 24, 2014

(65) Prior Publication Data
US 2015/0244303 A1  Aug. 27, 2015

(51) Int. Cl.
F02N 11/04  (2006.01)
H02K 23/52  (2006.01)
H02P 9/04  (2006.01)
H02P 31/00  (2006.01)
H02P 9/10  (2006.01)

(52) U.S. Cl.
CPC ............... H02P 31/00 (2013.01); F02N 11/04 (2013.01)

(58) Field of Classification Search
USPC ........................................ 290/31, 32; 322/60
See application file for complete search history.

(56) References Cited

U.S. PATENT DOCUMENTS

| | | | | |
|---|---|---|---|---|
| 4,093,869 A * | 6/1978 | Hoffmann et al. | | 290/31 |
| 4,743,777 A | 5/1988 | Shilling et al. | | 290/46 |
| 4,772,802 A * | 9/1988 | Glennon et al. | | 290/31 |
| 4,982,123 A * | 1/1991 | Raad | | 310/68 D |
| 5,334,898 A * | 8/1994 | Skybyk | | 310/268 |
| 5,493,200 A | 2/1996 | Rozman et al. | | 322/10 |
| 5,581,168 A * | 12/1996 | Rozman et al. | | 318/723 |
| 5,594,322 A * | 1/1997 | Rozman et al. | | 322/10 |
| 6,847,194 B2 * | 1/2005 | Sarlioglu et al. | | 322/10 |
| 6,906,479 B2 * | 6/2005 | Xu et al. | | 318/140 |
| 6,933,704 B2 * | 8/2005 | Nelson et al. | | 322/29 |
| 6,960,840 B2 * | 11/2005 | Willis et al. | | 290/52 |
| 6,998,726 B2 * | 2/2006 | Sarlioglu et al. | | 290/31 |
| 7,122,994 B2 * | 10/2006 | Anghel et al. | | 322/60 |
| 7,301,311 B2 * | 11/2007 | Xu et al. | | 322/59 |
| 7,388,300 B2 * | 6/2008 | Anghel et al. | | 290/39 |
| 7,514,806 B2 * | 4/2009 | Xu et al. | | 290/31 |
| 7,821,145 B2 | 10/2010 | Huang et al. | | 290/31 |
| 9,041,232 B2 * | 5/2015 | Shah et al. | | 290/1 A |
| 2004/0057257 A1 * | 3/2004 | Sarlioglu et al. | | 363/49 |
| 2004/0070373 A1 * | 4/2004 | Nelson et al. | | 322/28 |
| 2004/0108726 A1 * | 6/2004 | Sarlioglu et al. | | 290/38 R |
| 2005/0046398 A1 * | 3/2005 | Anghel et al. | | 322/60 |
| 2008/0067984 A1 * | 3/2008 | Anghel et al. | | 322/52 |
| 2008/0303280 A1 * | 12/2008 | Xu et al. | | 290/31 |
| 2014/0145541 A1 * | 5/2014 | Jalebi et al. | | 310/198 |
| 2015/0097372 A1 * | 4/2015 | Patel et al. | | 290/31 |

(Continued)

Primary Examiner — Pedro J Cuevas (57) ABSTRACT

A synchronous brushless machine having a single exciter field stator winding. The single exciter field stator winding is energized by a high frequency alternating current to provide a single excitation field to magnetically couple with the exciter field armature winding in both the starter mode and the generator mode. With a higher excitation frequency relative to the main armature current frequency, a steady main field voltage can be achieved which improves stability control while in the starter mode. In one or more configurations, the single exciter field stator winding is driven by a H-bridge converter.

23 Claims, 10 Drawing Sheets

(56) References Cited

U.S. PATENT DOCUMENTS

| | | | |
|---|---|---|---|
| 2015/0102659 A1* | 4/2015 | Liffring et al. | 307/9.1 |
| 2015/0103447 A1* | 4/2015 | Brouwer et al. | 361/1 |
| 2015/0103457 A1* | 4/2015 | Shander et al. | 361/88 |
| 2015/0198655 A1* | 7/2015 | Viswanathan et al. | 324/762.07 |

* cited by examiner

METHOD AND SYSTEM FOR CONTROLLING SYNCHRONOUS MACHINE AS GENERATOR/STARTER

TECHNICAL FIELD

The field of the embodiments presented herein relate to brushless bidirectional energy conversion systems that convert electrical energy to mechanical energy in a starter mode and mechanical energy to electrical energy in a generator mode and, more particularly, to a single excitation winding configuration which permits operation in either the starter mode or the generator mode.

BACKGROUND

Vehicles such as aircraft have an electromechanical machine functioning as a generator to provide electrical power to equipment loads throughout the aircraft. The primary function of the generator is to generate electricity, but the electromechanical machine when coupled to an engine may also be used as a starting motor to start the engine. When operating as the generator, mechanical energy is converted into electrical energy using electromagnetic induction. Reverse conversion of electrical energy into mechanical energy to provide torque to start the engine is done by the electric starting motor. Therefore, one electromechanical machine can operate as both an electric starting motor to drive the engine up to the desired idle speed and as a generator to provide electrical power to the aircraft which helps to reduce the cost and weight of the aircraft.

Typically the parts of the electromechanical machine are expressed in either mechanical or electrical terms which may be used interchangeably or in combination. The two principal components are the rotor and stator where the rotor is the rotating part of the generator or the starting motor and the stator is the stationary part of the generator or starting motor. The rotor of the electromechanical machine rotates within a magnetic field produced by permanent magnets or by field coils where current must flow in the field coils to generate the magnetic field. The process of generating a magnetic field with an electric current is called excitation.

U.S. Pat. No. 4,743,777 to Shilling et al., which is hereby incorporated herein by reference in its entirety, teaches that the rotor of these starter generator systems carries a main field winding and a three phase exciter armature winding along with a rectifier for rectifying the output of the exciter armature winding to provide DC excitation for the rotating DC main field winding. The stator includes a main armature winding and an exciter section of two windings. The main armature winding is magnetically coupled to the main field winding on the rotor.

The exciter section of two windings on the stator includes a first exciter field winding and a second exciter field winding that are both mounted to be magnetically coupled to the exciter armature windings of the rotor. The first exciter field winding is a multiple phase AC exciter field winding and the second exciter field winding is a DC exciter field winding. During starter motor operation, the AC exciter field winding receives power from an external power source. During generator operation, DC power is supplied to the DC exciter field winding. However, synchronous brushless machines utilizing two exciter field windings have a high number of components and require complicated controls which hurt reliability. Use of two excited field winding also requires more space and weight which makes the manufacture and use of the aircraft less efficient. Also, the field voltage of the generator is either increasing or decreasing due to the effect of variation of back electro-motive-force (back EMF) resulted from changing speed of the rotor during the starter mode.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a starter-generator system is provided. The starter-generator system includes a rotor mounted for rotation with respect to the stator, a main field winding, an exciter field armature winding, and a rectifier for rectifying an output from the exciter field armature winding to provide DC excitation for the main field winding. The main field winding, the exciter field armature winding, and the rectifier are mounted for rotation with the rotor. A main armature winding is mounted on the stator and magnetically coupled to the main field winding. A single exciter field stator winding is configured to provide a single excitation field to magnetically couple with the exciter field armature winding when the starter-generator system is operating in both a starter mode and in a generator mode.

According to another embodiment disclosed herein, a starter-generator system is provided. The starter-generator system includes a rotor mounted for rotation with respect to a stator, a main field winding, and an exciter field armature winding. A rectifier rectifies an output from the exciter field armature winding to provide DC excitation for the main field winding. The main field winding, the exciter field armature winding, and the rectifier are mounted for rotation with the rotor. A main armature winding is mounted on the stator and magnetically coupled to the main field winding. A single exciter field stator winding is configured to be energized by high frequency alternating current to provide a single excitation field to magnetically couple with the exciter field armature winding when the starter-generator system is operating in both a starter mode and in a generator mode. The frequencies of voltage waveforms at the exciter field armature winding vary with the speed of the rotor, the voltage waveforms at the exciter field armature winding have substantially the same amplitude as the speed of the rotor varies, and an amplitude of a voltage waveform at the main field winding remains constant as the speed of the rotor varies.

According to yet another embodiment disclosed herein, a method for controlling a synchronous brushless machine as a generator and a starter motor is provided. The method includes providing a single exciter field stator winding and an exciter field armature winding. The method then includes energizing the single exciter field stator winding with a high frequency alternating current. Next, the method includes providing a single excitation field to magnetically couple the single exciter field stator to the exciter field armature winding while the synchronous brushless machine operates in either a starter mode or in a generator mode. The method may also include varying frequencies of voltage waveforms at an exciter field armature winding while the voltage waveforms have substantially the same amplitude as a speed of the rotor varies. Also, the method could include maintaining a amplitude of a voltage waveform at a main field winding while the speed of the rotor varies.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to bidirectional energy conversion by brushless electronic systems that convert electrical energy to mechanical energy in a starter mode and mechanical energy to electrical energy in a generator mode. In particular, the disclosure relates to a starter-generator system having a single exciter field stator winding. The single exciter field stator winding is utilized during operation of the starter-generator in both the starter mode and the generator mode.

The present disclosure is susceptible of embodiment in many different forms. In conventional synchronous brushless machines, a three-phase exciter stator winding on the stator is required in the starter mode and a single phase winding on the stator in the generator mode. Specifically, in the present disclosure, only one simple exciter field winding for field excitation is needed on the stator in both the starter mode and the generator mode. This reduces the volume and weight of the exciter stage and therefore the starter-generator system. Also, improved stability control is also provided while operating the starter-generator in the starter mode.

There is no intent to limit the principles of the present disclosure to the particular disclosed embodiments. Vehicles such as aircraft may have one or more engines requiring the use of a starter-generator system having starter motor and a controller to start each engine. Switching control signals are generated for parallel transistors of the controller. In one or more confirmations, parallel transistors are excitation source implementations. For example, multiple H-bridges may be paralleled. In one or more configurations of the starter-generator system, the controller could include multiple parallel transistors and multiple controllers could be combined in parallel to provide a customized and correctly sized control system where different controllers could be tasked according to the needs of the vehicle.

In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

Figure 1:
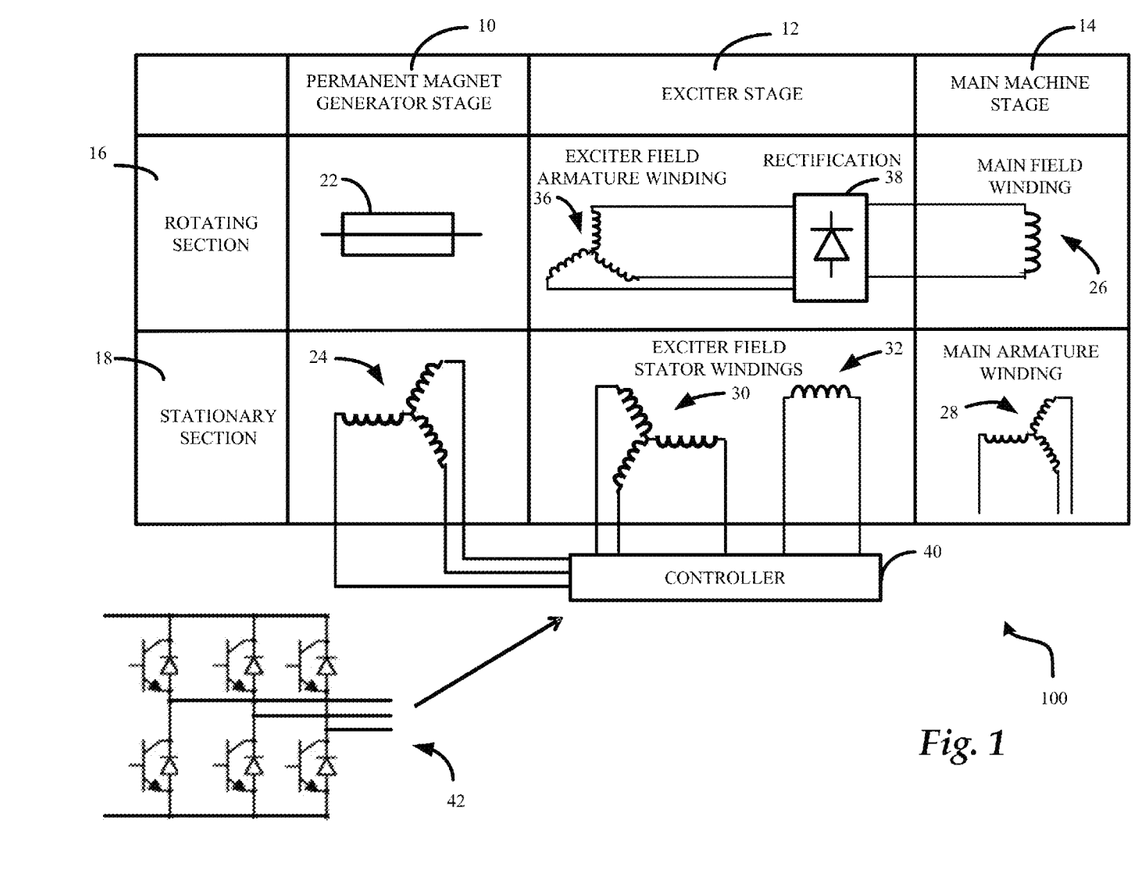
FIG. 1 illustrates a chart generally depicting the spatial relationship of the three stages of a conventional synchronous brushless machine with excitation control.

FIG. 1 illustrates a chart 100 generally depicting the spatial relationship of three stages of a conventional three-stage synchronous brushless machine with excitation control. Chart 100 corresponds with a conventional three stage synchronous brushless machine and, therefore, each of the three stages corresponds with a column of chart 100. The first stage is the permanent magnet generator stage 10 and is on the left, the second stage is the exciter stage 12 and is in the middle, and the third stage is the main machine stage 14 and is on the right. Also, in chart 100 of FIG. 1, an upper row corresponds with a rotor or a rotating section 16 of the three stage synchronous brushless machine and a lower row corresponds with a stator or a stationary section 18 of the three stage synchronous brushless machine. If only the exciter and main machine stages were included, then a two stage synchronous brushless machine would be depicted. An example of a two stage synchronous brushless machine is disclosed in U.S. Pat. No. 4,743,777. An example of a three stage synchronous brushless machine is disclosed in U.S. Pat. No. 7,821,145. However, exciter field stator windings which are reconfigurable as disclosed in the '145 patent are distinguishable the present disclosure. A two or three stage synchronous brushless machine may be referred to as a two stage starter-generator system or a three stage starter-generator system, respectively, or simply as a brushless machine.

The permanent magnet generator stage 10 includes a permanent magnet 22 in the rotating section 16 and a three phase alternating current (AC) winding 24 in the stationary section 18. The main machine stage 14 includes a main field winding 26 in rotating section 16 and a main armature winding 28 in the stationary section 18. The main armature winding 28 is a three phase AC armature and is preferably connected to an AC bus when the brushless machine is operated in the starter mode. When the brushless machine is needed to operate as a generator in the generator mode, the permanent magnet generator stage 10 is activated, via a co-shafted prime mover, to provide the energy required by the main field winding 26 so that the main armature winding 28 becomes the main energy source for providing electrical power throughout the aircraft. The stationary section 18 of the exciter stage 12 includes two different exciter field stator windings: a three phase AC winding 30 and a single phase direct current (DC) exciter field stator winding 32. Whether the three phase AC winding 30 or the single phase DC exciter field stator winding 32 is used depends on whether the brushless machine is being operated in the starter mode or in the generator mode. The rotating section 16 of the exciter stage 12 includes an exciter field armature winding 36 and a rectifier 38.

In FIG. 1, the controller 40 includes a three leg, six switch inverter 42. The controller 40 with the inverter 42 provides excitation sources of either a three phase AC current as well as a DC current excitation to the three phase AC exciter field stator winding 30, or a DC current excitation to the single phase DC exciter field stator winding 32, respectively. When operating in the starter mode, the controller 40 provides AC currents to energize the three phase AC exciter field stator winding 30 which generates an excitation field, which may simply be referred to as a magnetic field, to magnetically couple the three phase AC exciter field stator winding 30 to the exciter field armature winding 36 in the rotating section 16 of the exciter stage 12. The main field excitation current at main field winding 26 is obtained as a result of rectification by rectifier 38 of 3-phase currents at the exciter field armature windings 36. The main field excitation current interacts with the rotating magnetic field generated by 3-phase power input at the main armature winding 28, thus causing the rotor to rotate, and converting the electrical energy into mechanical energy.

During starter mode, the three phase AC excitation on the three phase AC exciter field stator winding 30 will have either forward or reverse phase sequence relative to the rotation of the rotor. Either choice of phase sequences has disadvantages. If the forward sequence is chosen, the magnetic field created by the three phase AC exciter field stator winding 30 has the same rotating direction as the rotor. As a result, the excitation on the main machine stage 14 will decrease as the speed of the rotor increases which is not desirable for a starting process. If the reverse sequence is chosen, the torque created by the excitation stage 12 will oppose main machine stage torque, which is also not desirable for the starting process. The disclosure below identifies how to obtain a constant main field voltage to eliminate the disadvantage associated with the forward and reverse phase sequencing relative to the rotation of the rotor.

However, when the brushless machine is operating in the generator mode, the controller 40 energizes the single phase DC exciter field stator winding 32 rather than the three phase AC exciter field stator winding 30. The DC exciter field stator winding 32 creates an excitation field to magnetically couple with the exciter field armature winding 36. The power source for the DC exciter field stator winding 32 is from the three phase stator armature windings 24 of the permanent magnet motor stage 10. In a generator mode, the prime mover turns the shaft, thus the permanent magnet 22 rotates, which creates a rotating magnetic field. This induces currents within the permanent magnet motor armature windings 24. The three phase currents from the three phase stator armature windings 24 are then conducted to a rectifier within the controller 40. The rectified current, a DC current, provides an excitation current at the DC exciter field stator winding 32 in the stationary section 18 of the excitation stage 12.

Three phase AC power from the exciter field armature winding 36 is rectified by rectifier 38 to provide DC current to the main field winding 26 in the rotating section 16 of the main machine stage 14. The main field winding 26 creates a second excitation field to magnetically couple the main field winding 26 to the main armature winding 28 in the stationary section 18 of the main machine stage 14. When in the generator mode, three phase AC current is provided from the main armature winding 28 to an AC power bus of a vehicle. Thus, although the two exciter field windings are utilized separately at different times in FIG. 1, both exciter field stator windings 30, 32 are necessary to operate the brushless machine in both the starter mode and the generator mode.

Figure 2:
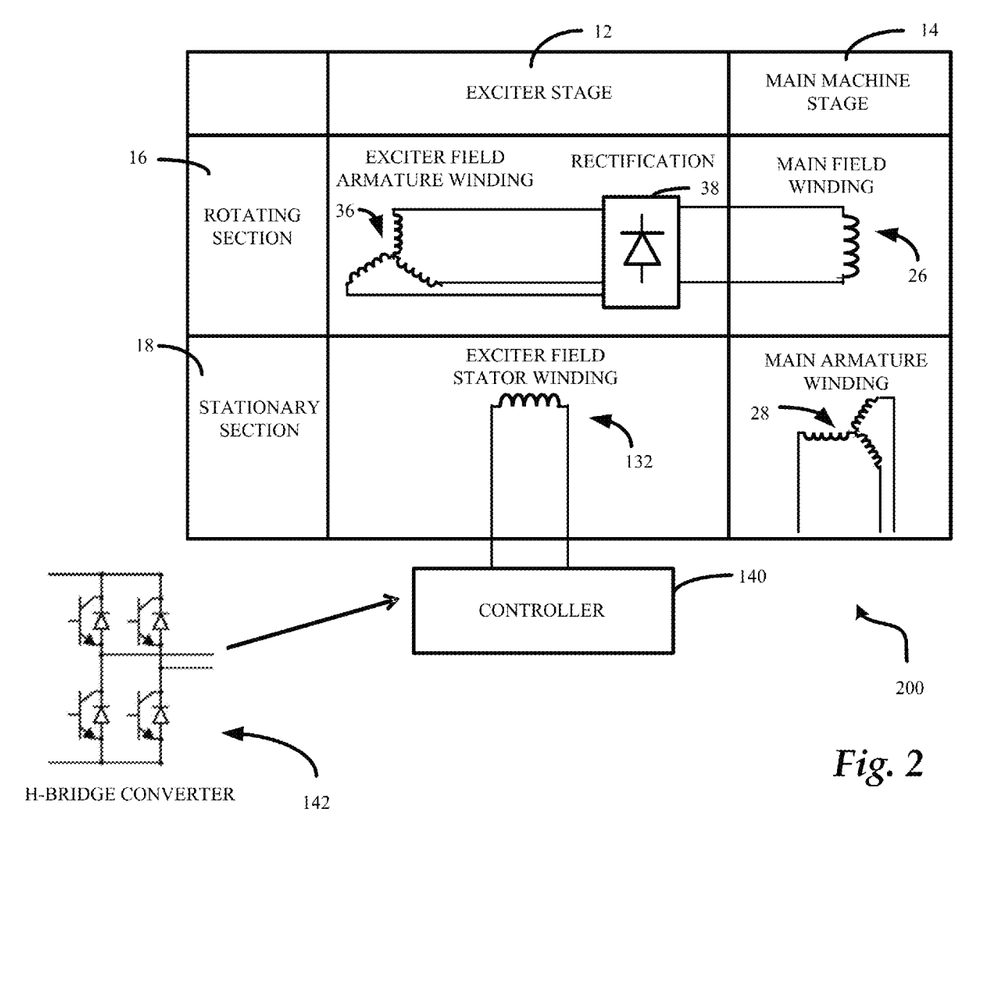
FIG. 2 illustrates a chart generally depicting the spatial relationship of a two-stage synchronous brushless machine with a single excited field winding and control according to at least one embodiment disclosed herein.

FIG. 2 illustrates a chart 200 generally depicting the spatial relationship of a two stage. Other than illustrating a two-stage rather than a three-stage synchronous brushless machine, chart 200 is distinguishable from chart 100 in that the stationary section 18 of the exciter stage 12 includes a single excited field stator winding 132. Only the single exciter field stator winding 132 provides the excitation field to magnetically couple with the exciter field armature winding 36 in both the starter mode and the generator mode. The single exciter field stator winding 132 is energized by the controller 140. The controller 140 preferably includes an H-bridge converter 142 as the excitation source providing a high frequency alternating current (greater than a fundamental electrical frequency of the starter-generator, for example, substantially greater than 400 Hertz) excitation to the single exciter field stator winding 132 in both the starter mode and the generator mode of the brushless machine. For example, frequency of the excitation voltage from the H-bridge converter 142 of the controller 140 could be about 10 kilohertz (kHz) alternating current to energize the single exciter field stator winding 132. Preferably, the frequency of the alternating current is substantially higher that the current frequency of the main armature winding 28 which is about 400 Hz to about 800 Hz.

Figure 3:
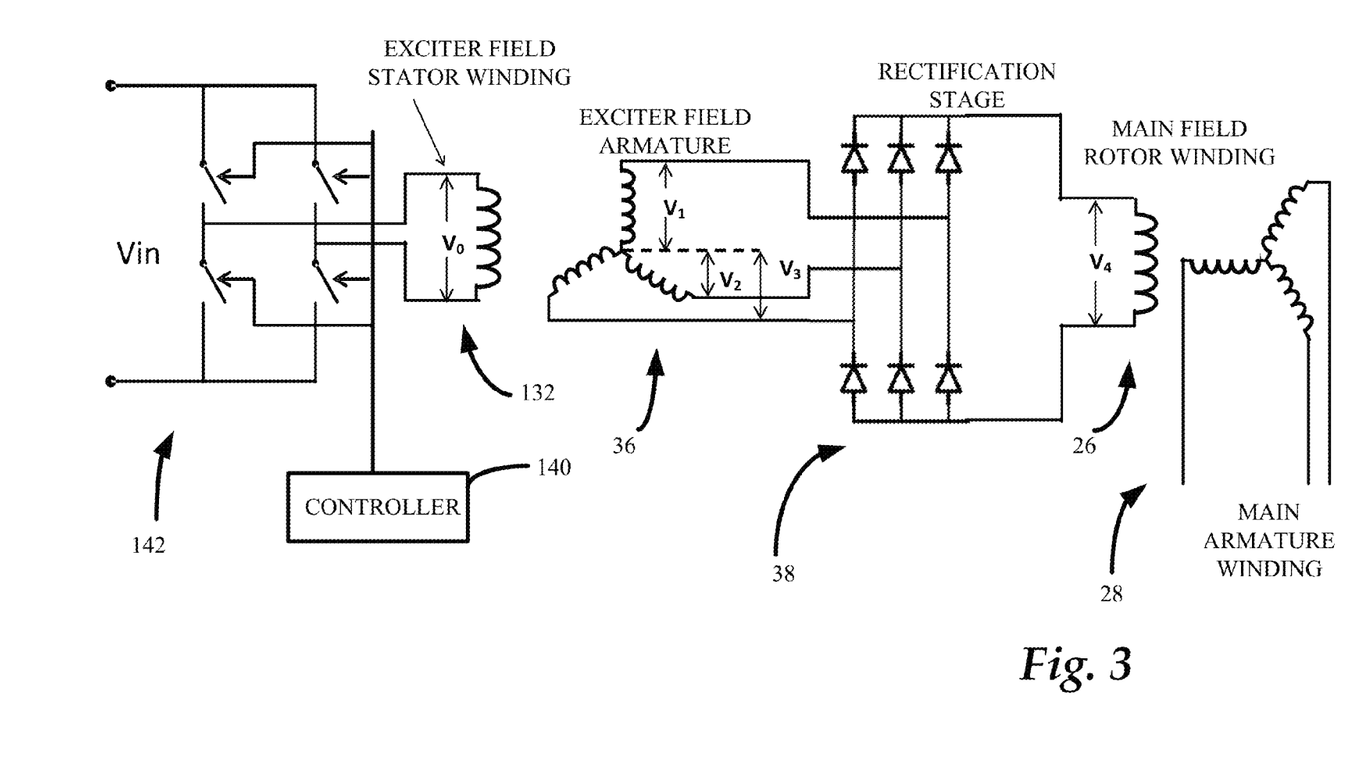
FIG. 3 illustrates a linear view of the two-stage synchronous brushless machine of FIG. 2 with a single excited field winding and control according to at least one embodiment disclosed herein.

Also, as a result of the single exciter field stator winding 132, the exciter field armature winding 36 can be a single phase winding or a multi-phase winding and, therefore, create a transformer effect. For example, a single phase exciter field armature winding 36 and the single exciter field stator winding define a transformer configured to transform an alternating current input voltage between the single exciter field stator winding 132 and the exciter field armature winding 36. Although shown in FIG. 2 as a three phase winding, the exciter field armature winding 36 in some configurations, for example, may be a two phase winding or have more than three phases. FIG. 3 illustrates a linear view of the two-stage synchronous brushless machine of FIG. 2 with the single excited field stator winding 132.

As mentioned above in regard to FIG. 1, as a result of the combination of the three phase AC exciter field stator winding 30 and the single phase DC exciter field stator winding 32, two excitation sources are required in order to operate in both the starter and generator modes. However, in regard to FIG. 2, use of the single exciter field stator winding 132 requires only a single excitation source. Therefore, only the H-bridge converter 142 of the controller 140 is utilized as the excitation source to provide the high frequency excitation to the single exciter field stator winding 132 in both the starter mode and the generator mode of the brushless machine. Utilizing only the single exciter field stator winding 132 in both the starter mode and the generator mode reduces volume and weight and also reduces the number of control components which increases reliability. Also, requiring the use of only one excitation source in both the starter mode and the generator mode results in less excitation source and control complexity. Because of the substantially higher excitation frequency relative to the main armature current frequency, a steady main field voltage can be achieved which improves stability control during the starter mode. Also, by using high frequency excitation the exciter field armature winding 36 and back iron weight may be reduced.

Figure 4:
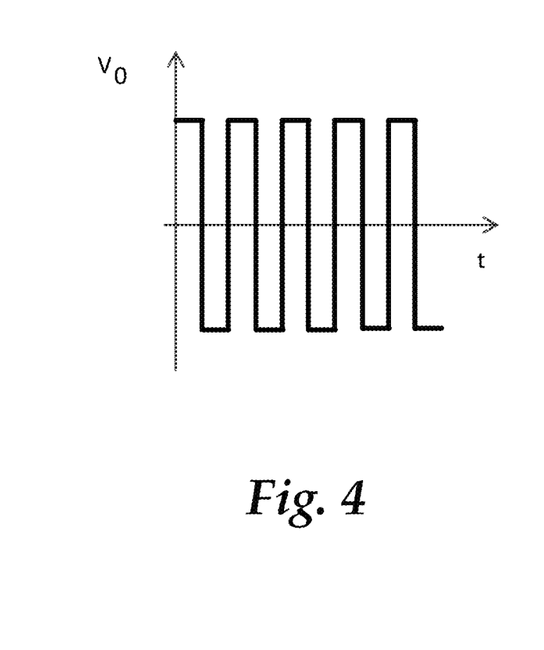
FIG. 4 illustrates an alternating excitation square wave voltage from a H-bridge excitation source according to at least one embodiment disclosed herein.

The high frequency (for example about 10 kHz) excitation voltage output of the H-bridge converter 142 is an alternating excitation square wave voltage $V_0$, as shown in FIG. 4. A square wave is plotted because the H-bridge converter 142 is used. Practically, a high frequency sine-wave, or any high frequency alternating current wave, can also be used as a excitation source.

Figure 5:
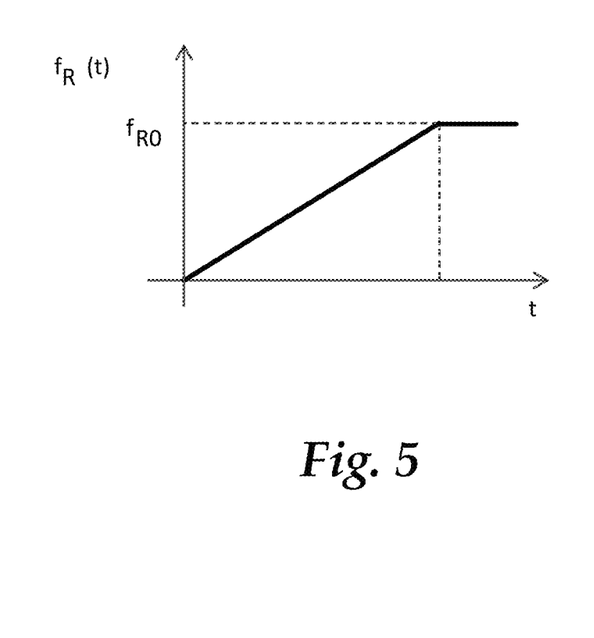
FIG. 5 illustrates a machine rotor speed curve with a linear ramp from zero speed to a steady or constant speed at some point in time according to at least one embodiment disclosed herein.

FIG. 5 illustrates a speed curve $f_R(t)$ corresponding with a machine rotor speed $f_{RO}$ over time. The speed curve $f_R(t)$ includes a linear ramp beginning from zero speed. The speed of the rotor $f_{RO}$ reaches a steady or constant speed at some point in time. The speed of the rotor is shown by the armature current frequency which is typically at a steady state of about 400 Hz.

Figure 6A:
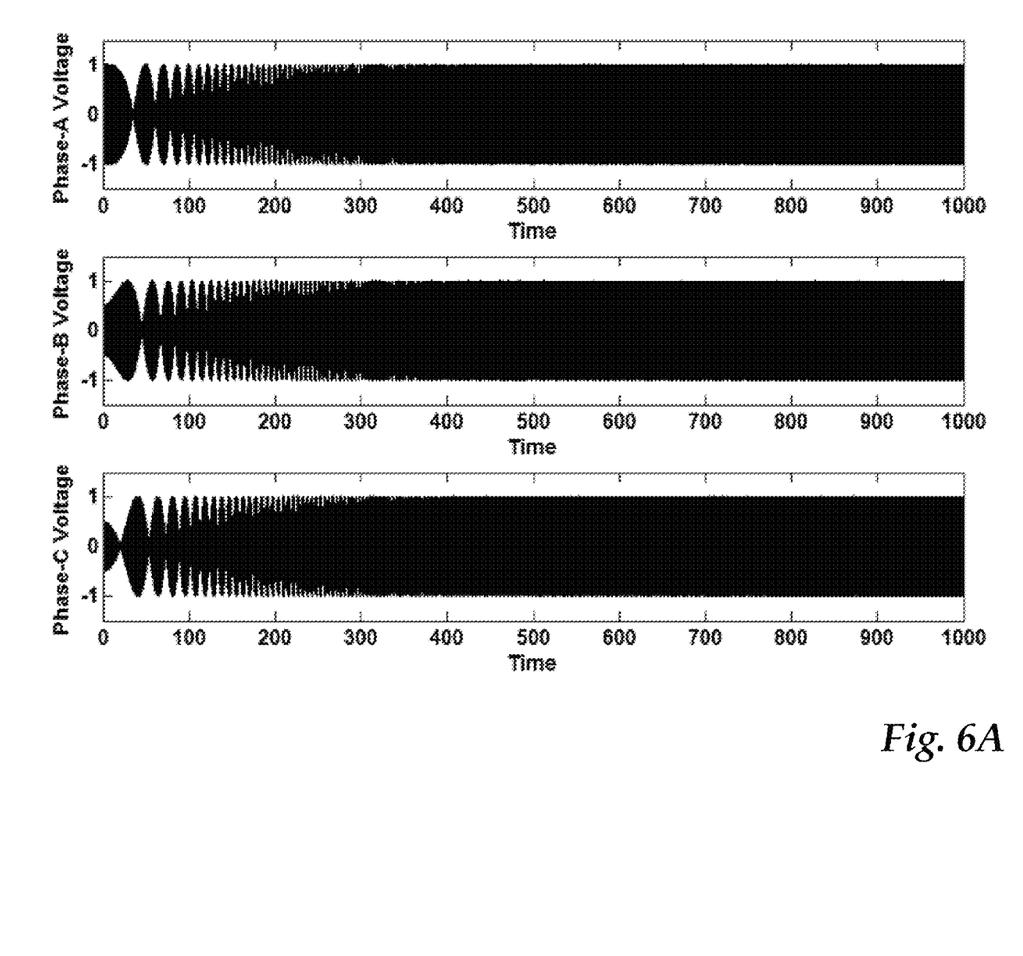
FIG. 6A illustrates verification results of exciter three phase voltage waveforms that are interleaved, have the same amplitude, and that have increasing frequencies shown by their increasing density in linear time scale due to the increasing rotor speed according to at least one embodiment disclosed herein.
Figure 6B:
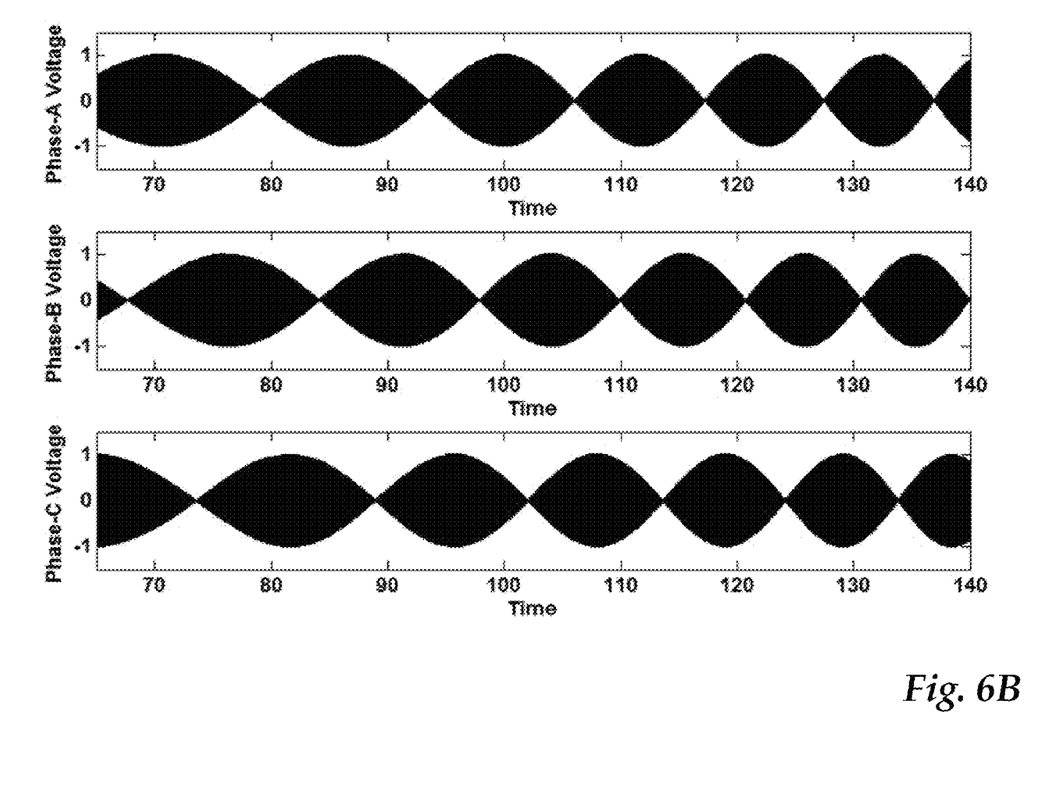
FIG. 6B is an expanded view of the waveforms of FIG. 6A according to at least one embodiment disclosed herein.
Figure 6C:
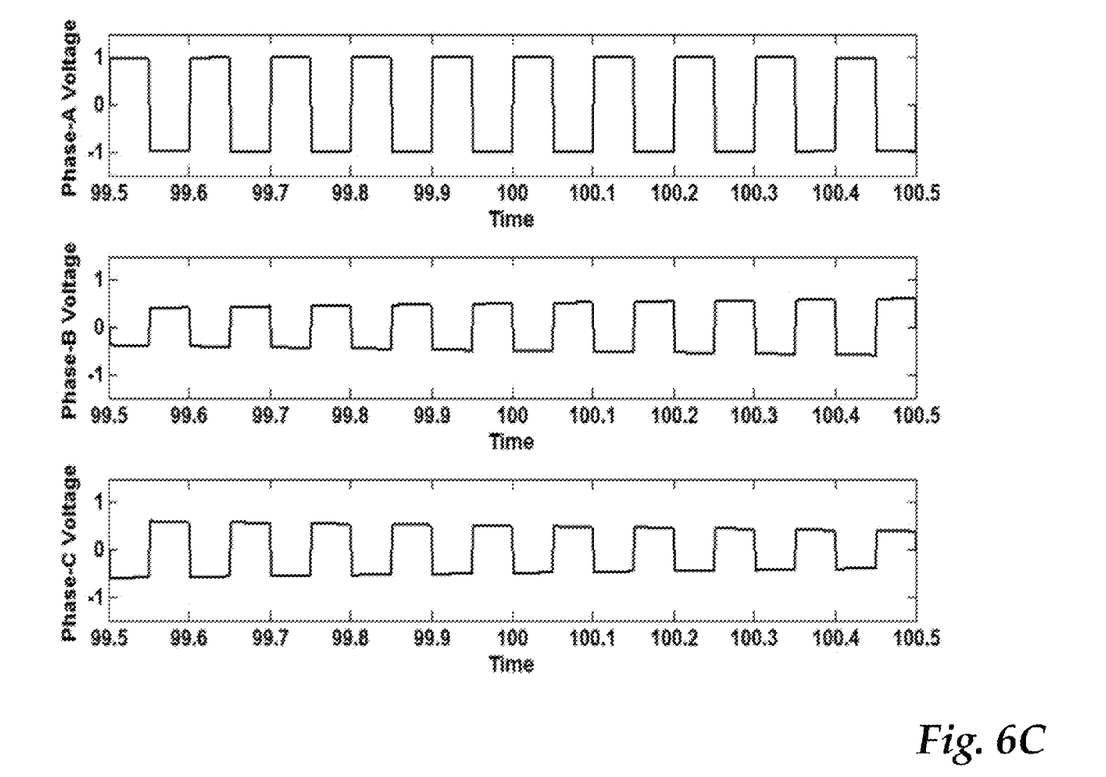
FIG. 6C is an expanded view of the waveforms of FIG. 6B according to at least one embodiment disclosed herein.

Referring back to FIG. 3, depicted along with the exciter field armature 36 are the three phase exciter armature voltages $V_1$, $V_2$ and $V_3$. Waveforms of the three phase exciter field armature voltages $V_1$, $V_2$ and $V_3$ are illustrated in FIG. 6A. The waveforms of the phase exciter armature voltages $V_1$, $V_2$ and $V_3$ are interleaved and each have the same amplitude at a particular point in time. Although the excitation voltage $V_0$ of the excitation source has a high frequency which is constant, the frequency of each of the three phase exciter field armature voltages $V_1$, $V_2$ and $V_3$ changes. The three phase exciter field armature voltages $V_1$, $V_2$ and $V_3$ increase in a linear time scale as a result of the increasing rotor speed $f_{RO}$ which is shown in FIG. 6A by the waveforms of $V_1$, $V_2$ and $V_3$ becoming denser towards the right. FIG. 6B is an expanded view of the waveforms of FIG. 6A and FIG. 6C is an expanded view of the waveforms of FIG. 6B. FIGS. 6A and 6B better illustrate that the waveforms of $V_1$, $V_2$ and $V_3$ are interleaved by about 120 degrees, have the same amplitude at a particular point in time, and are modulated with a frequency of about 0 to 400 Hz which corresponds with the machine rotor speed $f_{RO}$.

Figure 7:
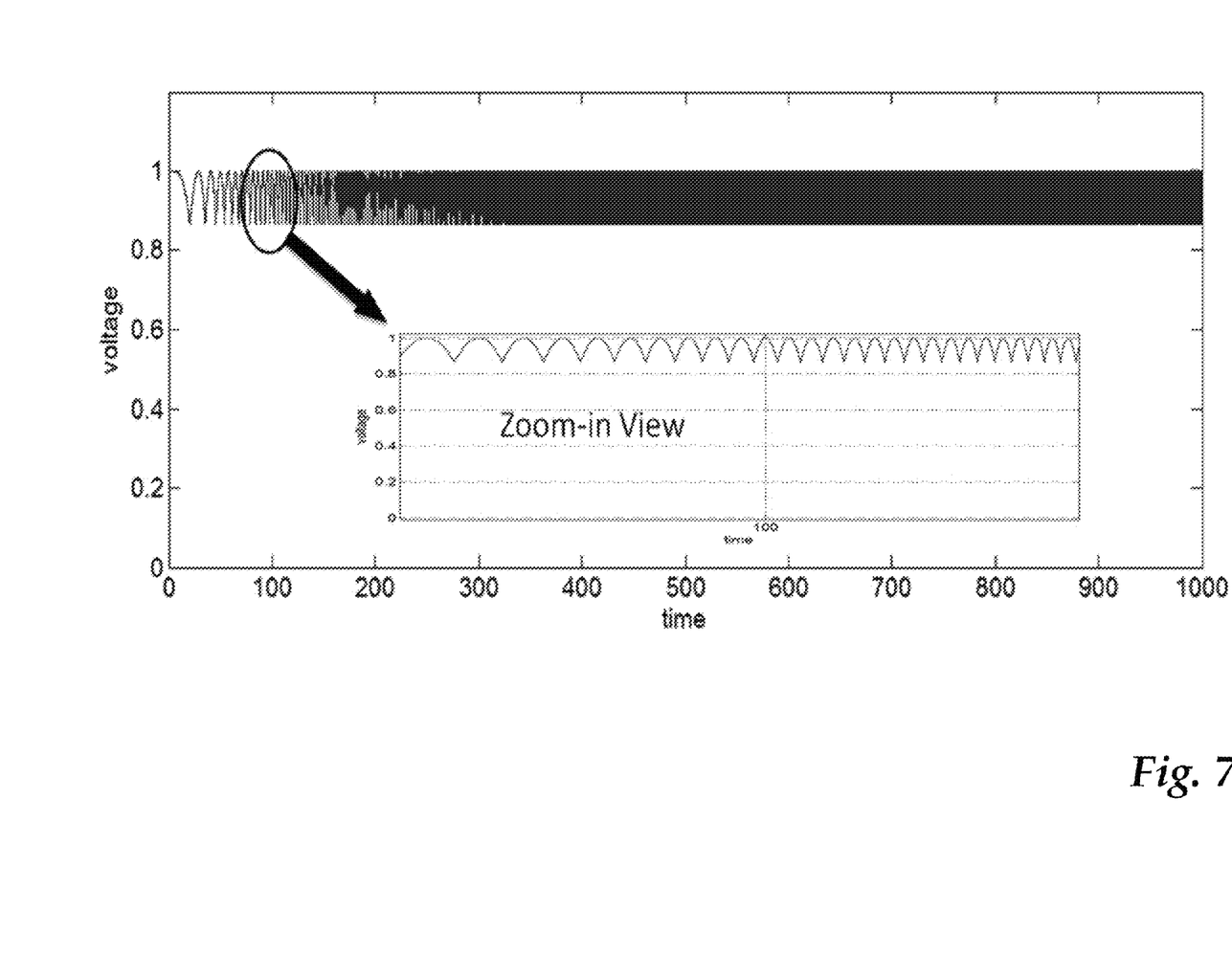
FIG. 7 illustrates verification results of the waveform of the main generator field voltage $V_o$ according to at least one embodiment disclosed herein.

FIG. 3 also depicts a main generator field voltage $V_4$ in association with the main field winding 26. FIG. 7 then illustrates verification results of the waveform of the main generator field voltage $V_4$. As shown in FIG. 7, the waveform of the main generator field voltage $V_4$ includes ripples. The steady value of the main generator field voltage $V_4$ is independent of the machine rotor speed $f_{RO}$, but the frequency of the ripples correspond with the machine rotor speed $f_{RO}$. The ripples become faster as a function of the machine rotor speed $f_{RO}$. This is distinguishable from the excitation methods disclosed in association with the brushless machine of FIG. 1 which has either an increasing or decreasing main generator field voltage.

Figure 8:
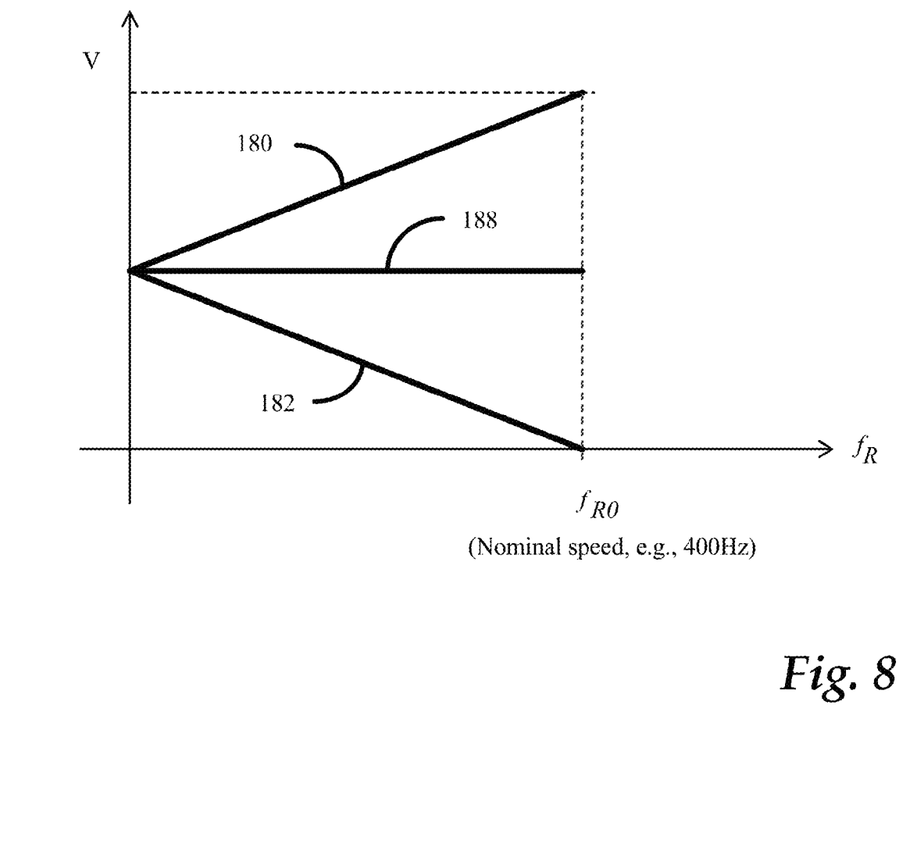
FIG. 8 illustrates a comparison of the main field voltage envelope versus the envelopes of conventional excitation methods used with the convention synchronous brushless machine of FIG. 1, according to at least one embodiment disclosed herein.

FIG. 8 illustrates a comparison of the envelope of the main field voltage envelope $V_4$ versus the envelopes of conventional excitation methods of the brushless machine disclosed in association with FIG. 1. With conventional excitation methods the amplitude of the voltage envelope is a function of machine rotor speed $f_{RO}$. In FIG. 8, the increasing line 180 corresponds with the conventional excitation method using reverse phase sequence and the decreasing line 182 corresponds with the conventional excitation method using forward phase sequence. However, utilizing the excitation method described above with a high frequency AC excitation voltage and the single exciter field stator winding 132 in both the starter mode and the generator mode of the brushless machine, the amplitude of the main generator field voltage $V_4$ is constant as depicted by line 188. High frequency excitation, instead of low frequency excitation, results in a steady main generator field voltage that is easier to control. Constant main generator field voltage $V_4$ is preferred for controlling a brushless machine as a stating motor for an engine such as an aircraft engine. A single control method for both the starter mode and the generator mode simplifies control design and reduces the number of components.

Figure 9:
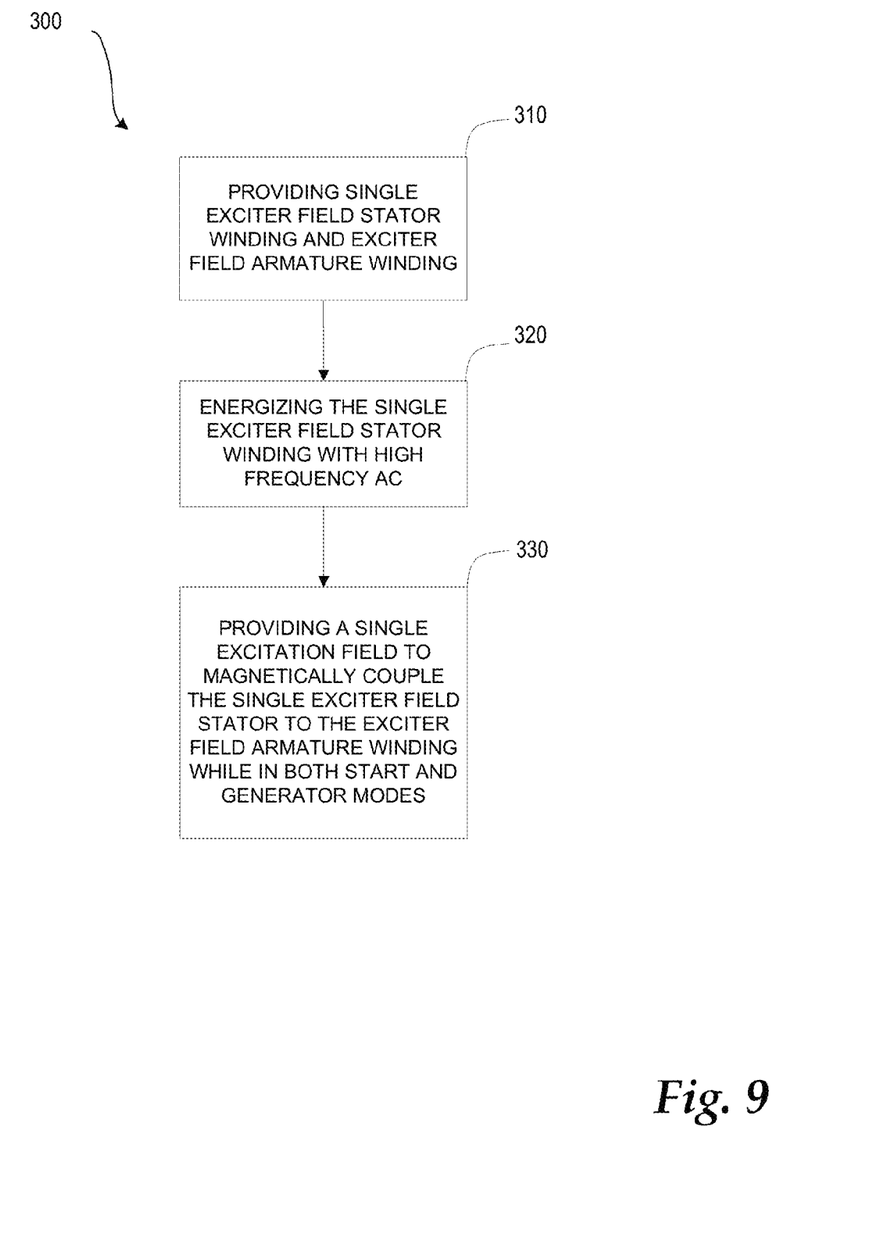
FIG. 9 illustrates one configuration of a method for controlling a synchronous brushless machine having a rotor and stator as a generator and as a starter motor according to at least one embodiment disclosed herein.

FIG. 9 illustrates a method 300 for method for controlling a synchronous brushless machine having a rotor and stator as a generator and as a starter motor. Unless otherwise indicated, more or fewer operations may be performed than shown in the figures and described herein. Additionally, unless otherwise indicated, these operations may also be performed in a different order than those described herein.

The method 300 starts at operation 310 where a single exciter field stator winding and an exciter field armature winding is provided. Next, operation 320 includes energizing the single exciter field stator winding 132 with a high frequency alternating current. Operation 330 includes providing a single excitation field to magnetically couple the single exciter field stator winding 132 to the exciter field armature winding 36 while the synchronous brushless machine operates in both a starter mode and in a generator mode.

The method 300 may also include the operation of maintaining the amplitude of a voltage waveform at a main field winding while a speed of the rotor varies. The method 300 may also include the operation of varying frequencies of voltage waveforms at an exciter field armature winding 36 while the voltage waveforms have substantially the same amplitude as a speed of the rotor varies. Method 300 may also include the operation of driving the single exciter field stator winding 132 with an H-bridge converter 142. Method 300 may also include the operation of starting an engine of an aircraft while the synchronous brushless machine is in the starter mode and the operation of powering equipment loads of an aircraft while the synchronous brushless machine is in the generator mode.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A starter-generator system comprising:
    a stator;
    a rotor mounted for rotation with respect to the stator;
    a main field winding;
    an exciter field armature winding;
    a rectifier for rectifying an output from the exciter field armature winding to provide DC excitation for the main field winding, wherein the main field winding, the exciter field armature winding, and the rectifier are mounted for rotation with the rotor;
    a main armature winding mounted on the stator and magnetically coupled to the main field winding; and
    a single dual-mode exciter field stator winding configured to provide a single excitation field to magnetically couple with the exciter field armature winding when the starter-generator system is operating in a starter mode and when the starter-generator system is operating in a generator mode.

2. The starter-generator system of claim 1, wherein a single excitation source is provided to the single exciter field stator winding when the starter-generator system is operating in the starter mode and when the starter-generator system is operating in a generator mode.

3. The starter-generator system of claim 2, wherein the single excitation source comprises a high frequency alternating current.

4. The starter-generator system of claim 3, wherein a frequency of the high frequency alternating current is greater than a fundamental electrical frequency of the starter-generator system.

5. The starter-generator system of claim 1, wherein the single exciter field stator winding is driven by an H-bridge converter.

6. The starter-generator system of claim 1, wherein only the single exciter field stator winding is magnetically coupled to the exciter field armature winding while operating in the starter mode and while operating in the generator mode.

7. The starter-generator system of claim 1, wherein a magnetic field created by the exciter field stator winding does not rotate.

8. The starter-generator system of claim 1, wherein an amplitude of a voltage waveform at the main field winding remains constant while a speed of the rotor varies.

9. The starter-generator system of claim 1, wherein frequencies of voltage waveforms at the exciter field armature winding vary with a speed of the rotor and the voltage waveforms have substantially the same amplitude as the speed of the rotor varies.

10. The starter-generator system of claim 1, wherein the exciter field armature winding is a single phase winding.

11. The starter-generator system of claim 1, wherein the exciter field armature winding is a multi-phase winding.

12. The starter-generator system of claim 1, wherein the single exciter field stator winding and the exciter field armature winding are both single phase windings.

13. The starter-generator system of claim 1, wherein the exciter field armature winding and the single exciter field stator winding define a transformer configured to transform an alternating current input voltage between the single exciter field stator winding and the exciter field armature winding.

14. The starter-generator system of claim 1, wherein the starter-generator system is a two-stage synchronous brushless machine.

15. The starter-generator system of claim 1, wherein the starter-generator system is a three-stage synchronous brushless machine.

16. A starter-generator system comprising:
a stator;
a rotor mounted for rotation with respect to the stator;
a main field winding;
an exciter field armature winding;
a rectifier for rectifying an output from the exciter field armature winding to provide DC excitation for the main field winding, wherein the main field winding, the exciter field armature winding, and the rectifier are mounted for rotation with the rotor;
a main armature winding mounted on the stator and magnetically coupled to the main field winding; and
a single dual-mode exciter field stator winding configured to be energized by a high frequency alternating current to provide a single excitation field to magnetically couple with the exciter field armature winding when the starter-generator system is operating in a starter mode and when the start-generator system is operating in a generator mode,
wherein frequencies of voltage waveforms at the exciter field armature winding vary with a speed of the rotor, the voltage waveforms at the exciter field armature winding have substantially the same amplitude as the speed of the rotor varies, and an amplitude of a voltage waveform at the main field winding remains constant as the speed of the rotor varies.

17. The starter-generator system of claim 16, wherein a magnetic field created by the exciter field stator winding does not rotate.

18. A method for controlling a synchronous brushless machine having a rotor and stator and configured to be operated in a starter mode and in a generator mode, the method comprising:
energizing a single dual-mode exciter field stator winding of the synchronous brushless machine with a high frequency alternating current, thereby generating a single excitation field,
wherein the generated single excitation field operates, in the starter mode and in the generator mode of the synchronous brushless machine, to magnetically couple the single exciter field stator winding with an exciter field armature winding of the synchronous brushless machine.

19. The method of claim 18, further comprising maintaining an amplitude of a voltage waveform at a main field winding of the synchronous brushless machine while a speed of the rotor varies.

20. The method of claim 18, further comprising varying frequencies of voltage waveforms at an exciter field armature winding of the synchronous brushless machine while the voltage waveforms have substantially the same amplitude as a speed of the rotor varies.

21. The method of claim 18, wherein energizing the single exciter field stator winding comprises driving the single exciter field stator winding with an H-bridge converter.

22. The method of claim 18, further comprising starting an engine of an aircraft while the synchronous brushless machine is operating in the starter mode.

23. The method of claim 18, further comprising powering equipment loads of an aircraft while the synchronous brushless machine is operating in the generator mode.

* * * * *